(12) United States Patent
Chen (10) Patent No.: US 11,860,398 B2
(45) Date of Patent: Jan. 2, 2024

(54) BACKLIGHT APPARATUS USED IN ILLUMINATED KEYBOARD

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/296,244

(22) Filed: Apr. 5, 2023

(65) Prior Publication Data

US 2023/0350128 A1    Nov. 2, 2023

(30) Foreign Application Priority Data

Apr. 27, 2022   (TW) .................................. 111116018

(51) Int. Cl.
*F21V 8/00* (2006.01)

(52) U.S. Cl.
CPC ......... *G02B 6/0045* (2013.01); *G02B 6/0068* (2013.01)

(58) Field of Classification Search
CPC ............................ G02B 6/0045; G02B 6/0068
See application file for complete search history.

(56) References Cited

U.S. PATENT DOCUMENTS

2022/0139648 A1* 5/2022 Huang .................. H01H 13/83
345/170

FOREIGN PATENT DOCUMENTS

| CN | 201044219 Y | 4/2008 |
| TW | 202129195 A | 8/2021 |

* cited by examiner

*Primary Examiner* — Mary Ellen Bowman
(74) *Attorney, Agent, or Firm* — Muncy, Geissler, Olds & Lowe, P.C.

(57) ABSTRACT

A backlight apparatus used in an illuminated keyboard includes a light-guiding plate, a circuit board and a plurality of light-emitting devices all electrically bonded on the circuit board. The light-guiding plate has a plurality of through holes which each corresponds to one of the light-emitting devices. The circuit board is disposed on a back face of the light-guiding plate such that each light-emitting device is disposed within the corresponding through hole, and that a light-emitting side face of each light-emitting device faces a light incident surface of the corresponding through hole. A specific through hole of the through holes has an optical adjustment surface on the light incident surface thereof, and the optical adjustment surface has a curved surface central axis coaxial with a central optical axis of the corresponding light-emitting device.

7 Claims, 8 Drawing Sheets

BACKLIGHT APPARATUS USED IN ILLUMINATED KEYBOARD

CROSS-REFERENCE TO RELATED APPLICATION

This utility application claims priority to Taiwan Application Serial Number 111116018, filed Apr. 27, 2022, which is incorporated herein by reference.

BACKGROUND OF THE INVENTION

1. Field of the Invention

The invention relates to a backlight apparatus used in an illuminated keyboard, and in particular, to a backlight apparatus, used in an illuminated keyboard, capable of modulating a beam angle of a light emitted by a plurality of light-emitting devices into a light-guiding plate.

2. Description of the Prior Art

Illuminated keyboards have been common input peripheral apparatuses of data processing systems on the market. Most of current illuminated keyboards use backlight apparatuses.

A backlight apparatus of a prior art, used in an illuminated keyboard, includes a light-guiding plate and a plurality of light-emitting devices. The light-guiding plate has a plurality of through holes. Each light-emitting device is disposed within in the corresponding through hole thereof, and the light-emitting side face of each light-emitting device faces the light incident surface of the corresponding through hole. Each light-emitting device emits a light from the light-emitting side face to the light incident surface of the corresponding through hole, and then the light enters the light-guiding plate. It should be emphasized that in the backlight apparatus of the prior art, the light incident surfaces of the plurality of through holes are all flat planes which result in a fixed beam angle of the light emitted by the light-emitting devices entering the light-guiding plate.

However, the light-guiding plate of the backlight apparatus of the prior art also has a plurality of breakout holes thereon to match the assembly of the illuminated keyboard. Due to the arrangement and design of the plurality of light-emitting devices of the backlight apparatus of the prior art, it may be encountered that the distance between two adjacent breakout holes on the optical path of the light emitted by the light-emitting devices propagating in the light-guiding plate is relatively short so that it results in lighting shadows occurred behind the breakout holes, and the energy of the light emitted by the light-emitting devices cannot be effectively used.

In addition, due to the limitations of the mechanism or the circuit board used to electrically bond the plurality of light-emitting devices of the backlight apparatus of the prior art, it resulting in uneven brightness of the patterns on the keycaps of the illuminated keyboard that the number of the light-emitting devices cannot increase.

SUMMARY OF THE INVENTION

Accordingly, one scope of the invention is to provide a backlight apparatus, used in an illuminated keyboard, capable of modulating a beam angle of a light emitted by a plurality of light-emitting devices into a light-guiding plate.

A backlight apparatus according to a preferred embodiment of the invention is used in an illuminated keyboard. The backlight apparatus according to the preferred embodiment of the invention includes a light-guiding plate, a circuit board and a plurality of light-emitting devices. The light-guiding plate has a top face, a back face and a plurality of through holes. Each through hole has a respective light incident surface. The light-emitting devices all are electrically bonded on the circuit board. Each light-emitting device has a respective light-emitting side face and a respective central optical axis, and corresponds to one of the plurality of through holes. The circuit board is disposed on the back face of the light-guiding plate such that each light-emitting device is disposed within the corresponding through hole, and that the light-emitting side face of each light-emitting device faces the light incident surface of the corresponding through hole. Each light-emitting device emits a light from the light-emitting side face thereof to the light incident surface of the corresponding through hole, and then the light enters into the light-guiding plate. A first specific through hole of the plurality of through holes has a first optical adjustment surface on the light incident surface thereof. The first optical adjustment surface can be a first concave spherical surface, a first convex spherical surface, a first concave aspherical surface, a first convex aspherical surface, a first Fresnel concave arc surface, a first Fresnel convex arc surface, and so on. The first optical adjustment surface has a first curved surface central axis coaxial with the central optical axis of the corresponding light-emitting device.

In one embodiment, a first shortest distance between the first optical adjustment surface of the first specific through hole and the light-emitting side face of the corresponding light-emitting device can range from 0.04 mm to 0.12 mm.

In one embodiment, the light-guiding plate also has a first breakout hole. The first breakout hole is located on a first original optical path of the light, if without an adjustment by the first optical adjustment surface of the first specific through hole, entering the light-guiding plate from the light incident surface of the first specific through hole. After the light is adjusted by the first optical adjustment surface of the first specific through hole, a first adjusted optical path of the adjusted light entering the light-guiding plate does not pass through the first breakout hole.

In one embodiment, the light-guiding plate also has a second breakout hole. The second breakout hole is located on a second original optical path of the light, if without an adjustment by the first optical adjustment surface of the first specific through hole, entering the light-guiding plate from the light incident surface of the first specific through hole. After the light is adjusted by the first optical adjustment surface of the first specific through hole, a second adjusted optical path of the adjusted light entering the light-guiding plate does not pass through the second breakout hole. The first adjusted optical path and the second adjusted optical path are located between the first breakout hole and the second breakout hole.

According to a modification of the backlight apparatus of the invention, a second specific through hole of the plurality of through holes has a recession formed on the light incident surface. The recession has a second optical adjustment surface facing the light-emitting side face of the corresponding light-emitting device. The second optical adjustment surface can be a second convex spherical surface, a second convex aspheric surface, a second Fresnel convex arc surface, and so on. The second optical adjustment surface has a second curved surface central axis coaxial with the central optical axis of the corresponding light-emitting device.

In one embodiment, a second shortest distance between the second optical adjustment surface of the second specific through hole and the light-emitting side face of the corresponding light-emitting device can range from 0.04 mm to 0.12 mm.

According to another modification of the backlight apparatus of the invention, a third specific through hole of the plurality of through holes has a protrusion formed on the light incident surface. The protrusion has a third optical adjustment surface facing the light-emitting side face of the corresponding light-emitting device. The third optical adjustment surface can be a second concave spherical surface, a second concave aspheric surface, a second Fresnel concave arc surface, and so on. The third optical adjustment surface has a third curved surface central axis coaxial with the central optical axis of the corresponding light-emitting device.

In one embodiment, a third shortest distance between the third optical adjustment surface of the third specific through hole and the light-emitting side face of the corresponding light-emitting device can range from 0.04 mm to 0.12 mm.

Different from the prior art, the backlight apparatus used in the illuminated keyboard according to the invention, the beam angle of the light emitted by the light-emitting devices entering into the light-guiding plate can be adjusted. Thereby, the backlight apparatus used in the luminous keyboard according to the invention can effectively utilize the energy of the light emitted by the light-emitting devices. The brightness of the patterns on the keycaps of the illuminated keyboard using the backlight apparatus of the invention is uniform.

The advantage and spirit of the invention may be understood by the following recitations together with the appended drawings.

DETAILED DESCRIPTION OF THE INVENTION

Figure 1:
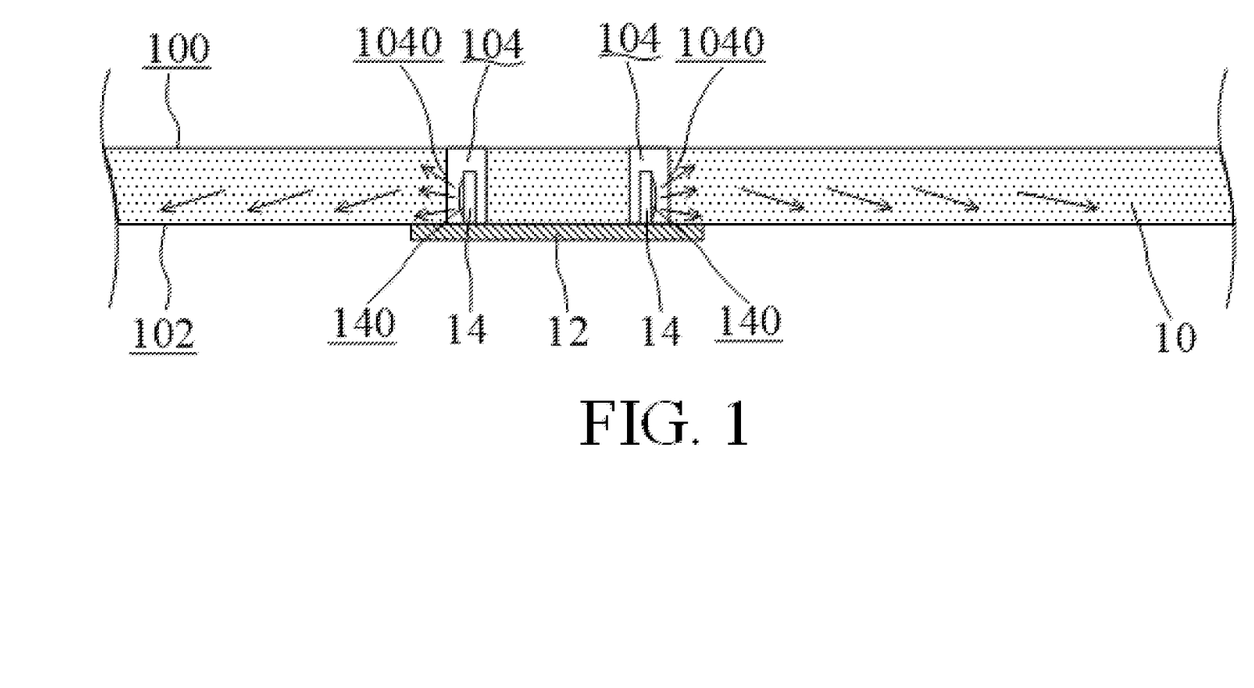
FIG. 1 is a partial cross-sectional view of the backlight apparatus used in the illuminated keyboard according to the preferred embodiment of the invention.
Figure 2:
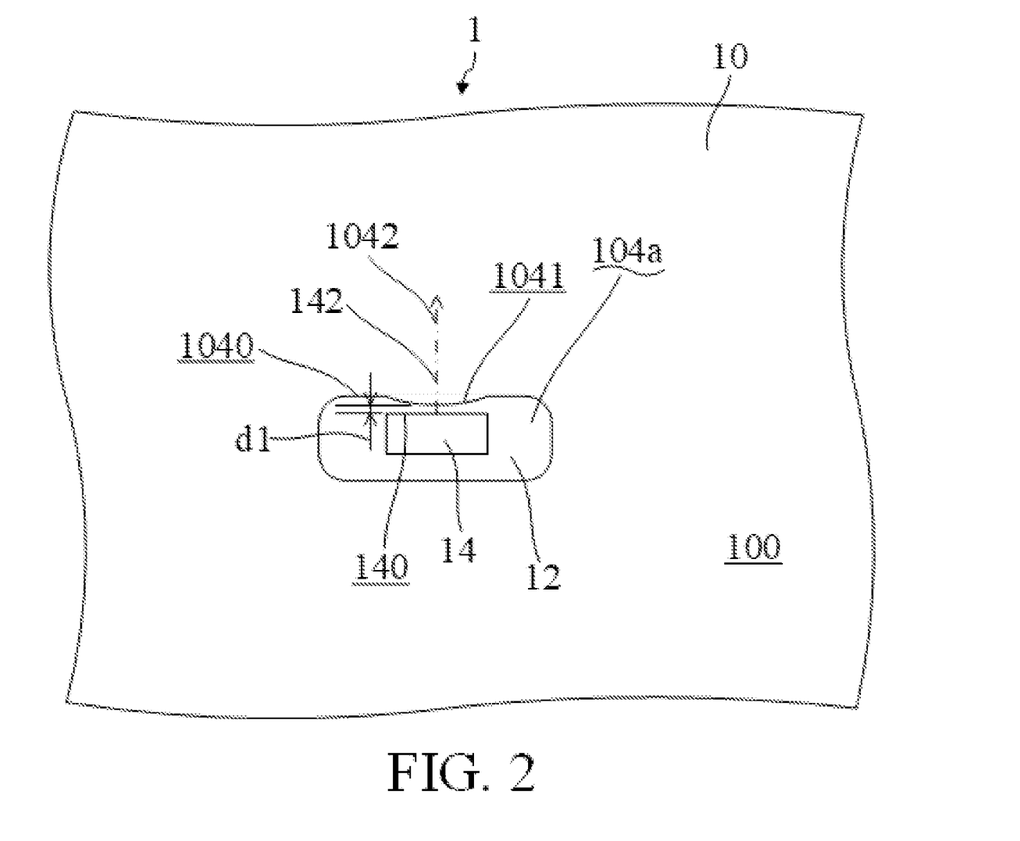
FIG. 2 is a partial top view of an example of the backlight apparatus used in the illuminated keyboard according to the preferred embodiment of the invention.
Figure 3:
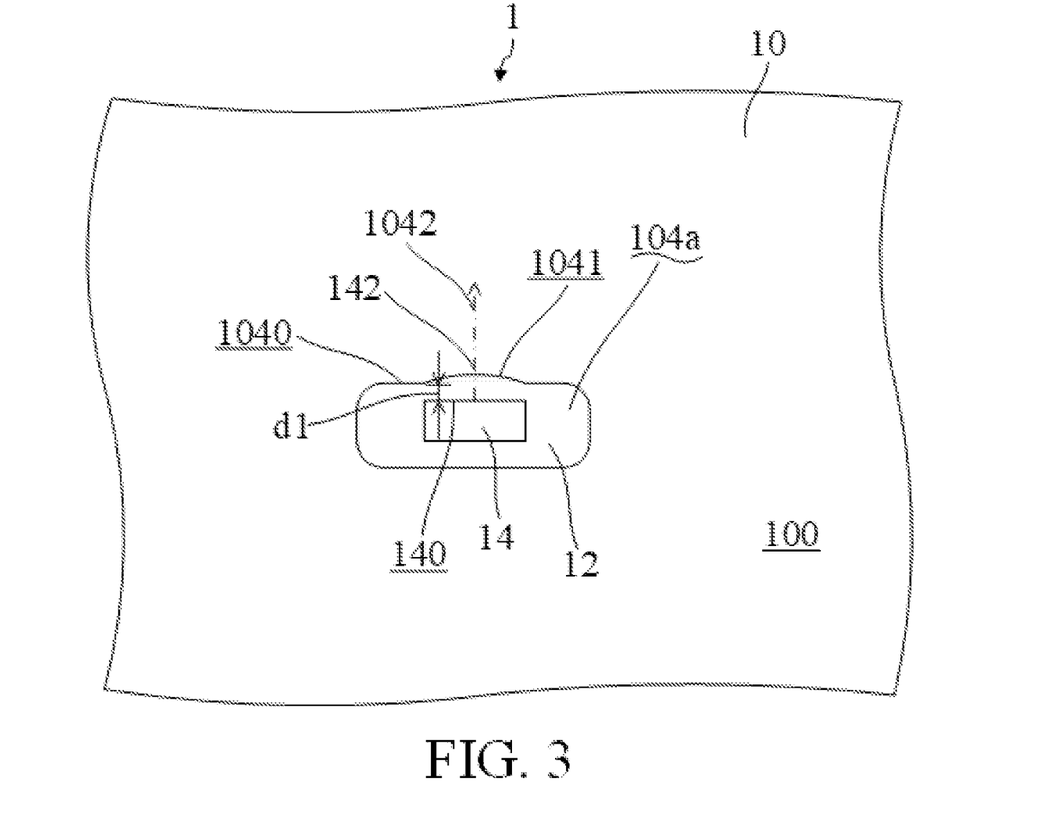
FIG. 3 is a partial top view of another example of the backlight apparatus used in the illuminated keyboard according to the preferred embodiment of the invention.
Figure 4:
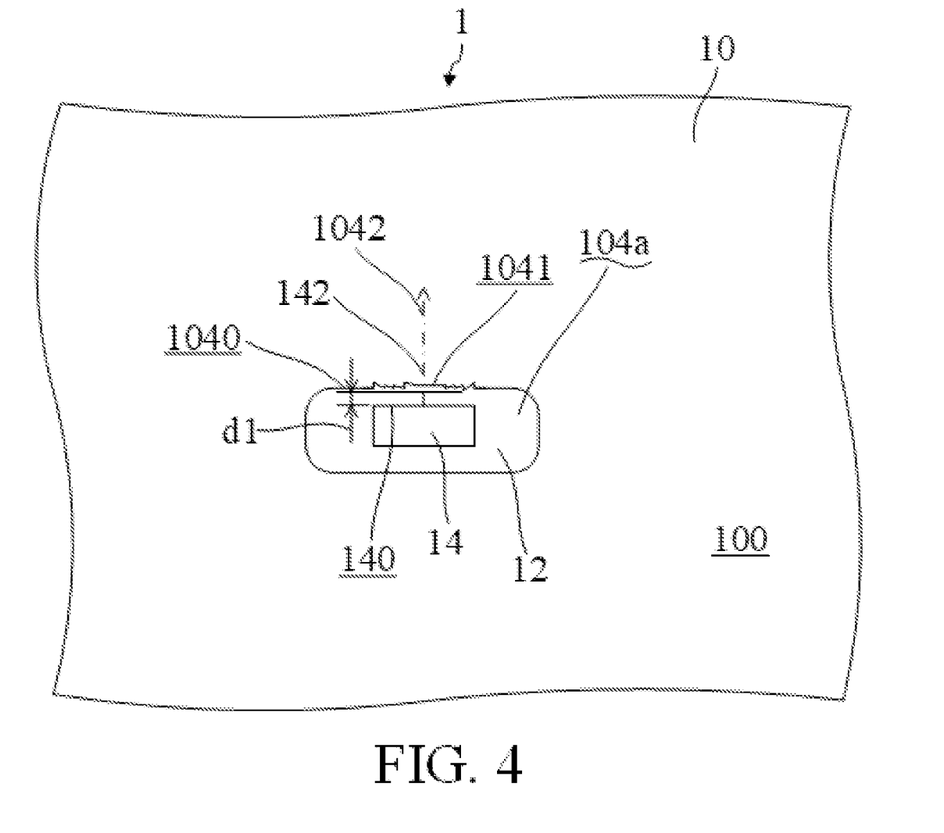
FIG. 4 is a partial top view of another example of the backlight apparatus used in the illuminated keyboard according to the preferred embodiment of the invention.
Figure 5:
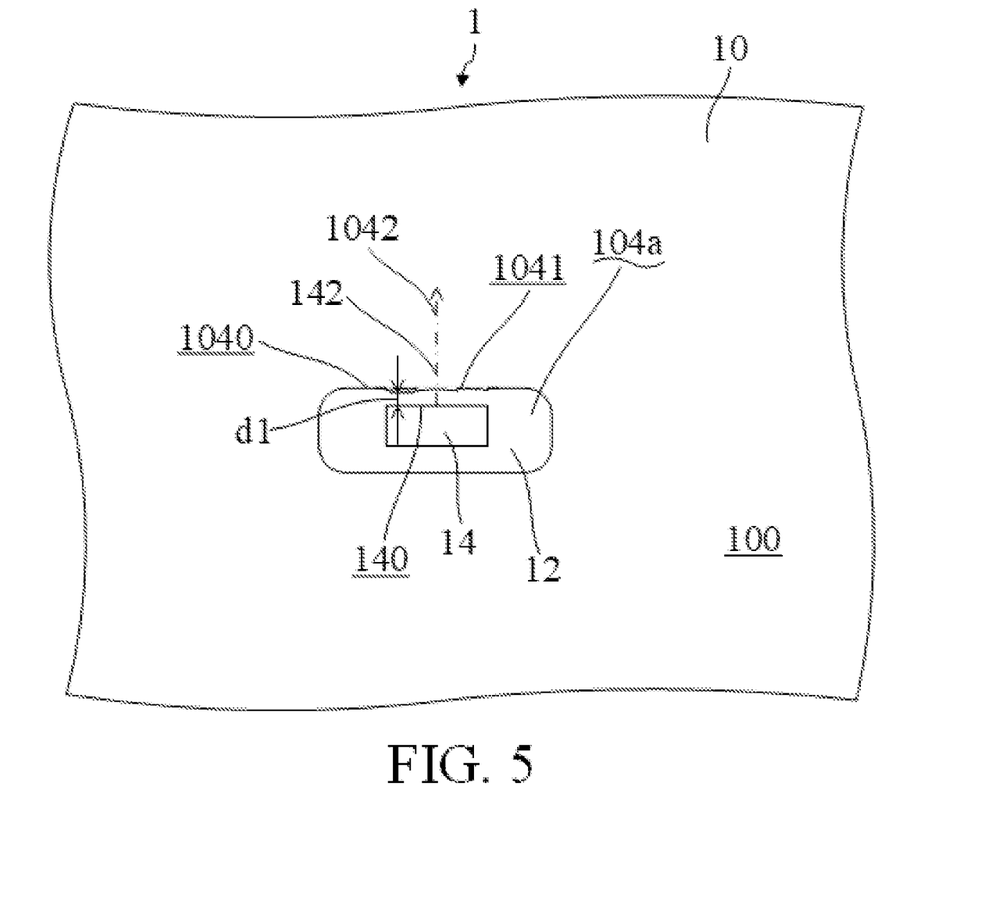
FIG. 5 is a partial top view of another example of the backlight apparatus used in the illuminated keyboard according to the preferred embodiment of the invention.

Referring to FIG. 1 to FIG. 5, those drawings schematically illustrate a backlight apparatus 1 used in an illuminated keyboard according to the preferred embodiment of the invention, and the illuminated keyboard is not shown in those drawings. FIG. 1 schematically illustrates with a partial cross-sectional view the backlight apparatus 1 used in the illuminated keyboard according to the preferred embodiment of the invention. FIG. 2 schematically illustrates with a partial top view an example of the backlight apparatus 1 used in the illuminated keyboard according to the preferred embodiment of the invention. FIG. 3 schematically illustrates with a partial top view another example of the backlight apparatus 1 used in the illuminated keyboard according to the preferred embodiment of the invention. FIG. 4 schematically illustrates with a partial top view another example of the backlight apparatus 1 used in the illuminated keyboard according to the preferred embodiment of the invention. FIG. 5 schematically illustrates with a partial top view another example of the backlight apparatus 1 used in the illuminated keyboard according to the preferred embodiment of the invention.

As shown in FIG. 1 and FIG. 2, the backlight apparatus 1 according to the preferred embodiment of the invention includes a light-guiding plate 10, a circuit board 12 and a plurality of light-emitting devices 14. The light-guiding plate 10 has a top face 100, a back face 102 and a plurality of through holes 104.

In one embodiment, the light-guiding plate 10 can be made of acrylic, silicone, thermoplastic polyurethane (TPU) or other commercial light-guiding polymer materials. The thickness of the light-guiding plate 10 can be determined according to needs, and there is no special limitation.

Each through hole 104 has a respective light incident surface 1040. The light-emitting devices 14 all are electrically bonded on the circuit board 12. Each light-emitting device 14 has a respective light-emitting side face 140 and a respective central optical axis 142, and corresponds to one of the plurality of through holes 104. The circuit board 12 is disposed on the back face 102 of the light-guiding plate 10 such that each light-emitting device 14 is disposed within the corresponding through hole 104, and that the light-emitting side face 140 of each light-emitting device 14 faces the light incident surface 1040 of the corresponding through hole 104. Each light-emitting device 14 emits a light from the light-emitting side face 140 thereof to the light incident surface 1040 of the corresponding through hole 104, and then the light enters into the light-guiding plate 10.

In one embodiment, each light-emitting device 14 can be a light-emitting diode or an organic light-emitting diode, but the invention is not limited thereto.

In particular, a first specific through hole 104a of the plurality of through holes 104 has a first optical adjustment surface 1041 on the light incident surface 1040 thereof. The first optical adjustment surface 1041 can be a first concave spherical surface, a first convex spherical surface, a first concave aspherical surface, a first convex aspherical surface, a first Fresnel concave arc surface, a first Fresnel convex arc surface, and so on. The first optical adjustment surface 1041 has a first curved surface central axis 1042 coaxial with the central optical axis 142 of the corresponding light-emitting device 14.

In the example shown in FIG. 2, the first optical adjustment surface 1041 is a first convex spherical surface. In the example shown in FIG. 3, the first optical adjustment surface 1041 is a first concave spherical surface. In the example shown in FIG. 4, the first optical adjustment surface 1041 is a first Fresnel convex arc surface. In the example shown in FIG. 5, the first optical adjustment surface 1041 is a first Fresnel concave arc surface. The devices and members in FIG. 3, FIG. 4 and FIG. 5 identical to those shown in FIG. 2 are given the same numerical notations, and will be not described in detail herein. When the first optical adjustment surface 1041 is a first convex spherical surface, a first convex aspheric surface, or a first Fresnel convex arc surface, the beam angle of the light, emitted by the light-emitting device 14, entering the light guide plate 10 is converged, that is, the first optical adjustment surface 1041 has a concentrating effect on the light emitted by the light-emitting device 14. When the first optical adjustment surface 1041 is a first concave spherical surface, a first concave aspherical surface, or a first Fresnel concave arc surface, the beam angle of the light, emitted by the light-emitting device 14, entering the light-guiding plate 10 is widened, that is, the first optical adjustment surface 1041 has an astigmatism effect of on the light emitted by the light-emitting device 14.

In one embodiment, the first optical adjustment surface 1041 can be formed by using a punching machine or a computer numerical control machine.

In one embodiment, in order to fit the plurality of light-emitting devices 14 into their corresponding through holes 104, and to consider the machining and manufacturing tolerances of the light guide plate 10, the circuit board 12 and other devices and members, a first shortest distance d1 between the first optical adjustment surface 1041 of the first specific through hole 104a and the light-emitting side face 140 of the corresponding light-emitting device 14 can range from 0.04 mm to 0.12 mm. The first shortest distance d1 also takes into consideration the optical design parameters (e.g., focal distance) of the first optical adjustment surface 1041.

Figure 6:
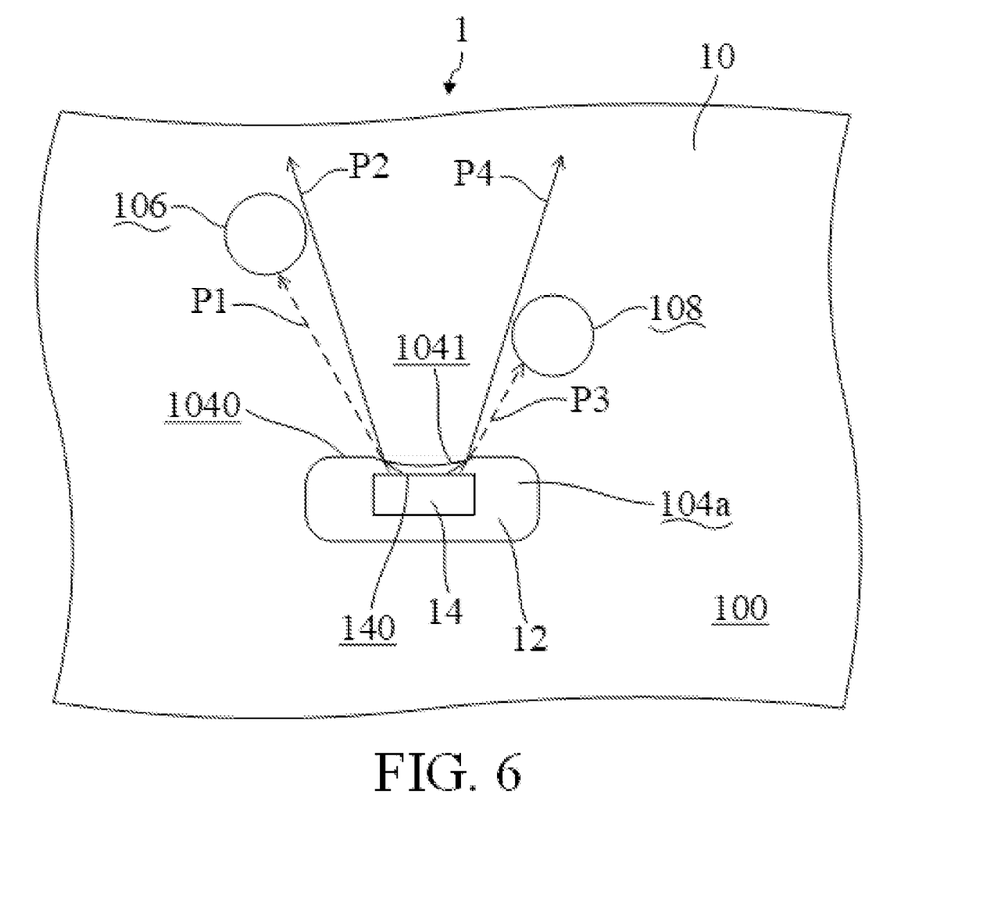
FIG. 6 is a partial top view of another example of the backlight apparatus used in the illuminated keyboard according to the preferred embodiment of the invention.

Referring to FIG. 6, FIG. 6 schematically illustrates with a partial top view another example of the backlight apparatus 1 used in the illuminated keyboard according to the preferred embodiment of the invention. As shown in FIG. 6, in one embodiment, the light-guiding plate 10 also has a first breakout hole 106. The first breakout hole 106 is located on a first original optical path P1 of the light, if without an adjustment by the first optical adjustment surface 1041 of the first specific through hole 104a, entering the light-guiding plate 10 from the light incident surface 1040 of the first specific through hole 104a. Herein, the first original optical path P1 refers to one boundary path of the light beam not being adjusted and traveling in the light-guiding plate 10 if the light beam enters the flat light incident surface 1040 of the first specific through hole 104a without the first optical adjustment surface 1041 formed thereon. Obviously, the light traveling along the first original optical path P1 will encounter the first breakout hole 106. After the light is adjusted by the first optical adjustment surface 1041 of the first specific through hole 104a, a first adjusted optical path P2 of the adjusted light entering the light-guiding plate 10 does not pass through the first breakout hole 106. Herein, the first adjusting optical path P2 is also one boundary path of the adjusted light beam traveling in the light-guiding plate 10. The devices and members in FIG. 6 identical to those shown in FIG. 2 are given the same numerical notations, and will be not described in detail herein.

Also as shown in FIG. 6, in one embodiment, the light-guiding plate 10 also has a second breakout hole 108. The second breakout hole 108 is located on a second original optical path P3 of the light, if without an adjustment by the first optical adjustment surface 1041 of the first specific through hole 104a, entering the light-guiding plate 10 from the light incident surface 1040 of the first specific through hole 104a. Herein, the second original optical path P3 refers to the other boundary path of the light beam not being adjusted and traveling in the light-guiding plate 10 if the light beam enters the flat light incident surface 1040 of the first specific through hole 104a without the first optical adjustment surface 1041 formed thereon. Obviously, the light traveling along the second original optical path P3 will encounter the second breakout hole 108. After the light is adjusted by the first optical adjustment surface 1041 of the first specific through hole 104a, a second adjusted optical path P4 of the adjusted light entering the light-guiding plate 10 does not pass through the second breakout hole 108. Herein, the first adjusting optical path P2 is also the other boundary path of the adjusted light beam traveling in the light-guiding plate 10. The first adjusted optical path P2 and the second adjusted optical path P4 are located between the first breakout hole 106 and the second breakout hole 108. Thereby, the backlight apparatus 1 according to the preferred embodiment of the invention can effectively utilize the energy of the light emitted by the light-emitting devices 14.

The backlight apparatus 1 according to the preferred embodiment of the invention further includes a light-shielding film (not shown in the figures) and a reflective sheet (not shown in the figures). The light-shielding film is disposed on the top surface 100 of the light-guiding plate 10. The reflective sheet is disposed on the back surface 102 of the light-guiding plate 10. The light-shielding film has a plurality of translucent parts. The light incident into the light-guiding plate 10 is guided by the light-guiding plate 10 and then passes through the plurality of translucent parts of the light-shielding film. The reflective sheet is used to reflect the light directed to the reflective sheet.

Figure 7:
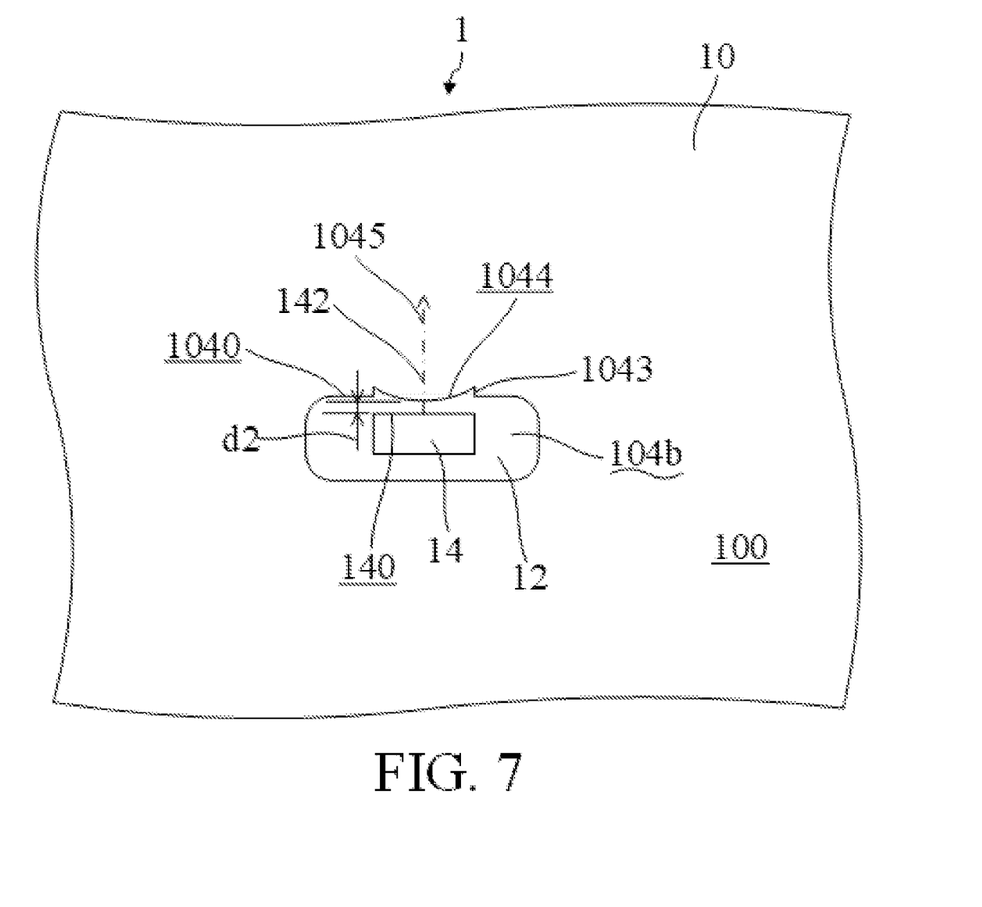
FIG. 7 is a partial top view of a modification of the backlight apparatus used in the illuminated keyboard according to the preferred embodiment of the invention.

Referring to FIG. 7, FIG. 7 schematically illustrates with a partial top view a modification of the backlight apparatus 1 keyboard according to the preferred embodiment of the invention. As shown in FIG. 7, in the modification of the backlight apparatus 1 of the invention, a second specific through hole 104b of the plurality of through holes 104 has a recession 1043 formed on the light incident surface 1040. The recession 1043 has a second optical adjustment surface 1044 facing the light-emitting side face 140 of the corresponding light-emitting device 14. The second optical adjustment surface 1044 can be a second convex spherical surface, a second convex aspheric surface, a second Fresnel convex arc surface, and so on. The second optical adjustment surface 1044 has a second curved surface central axis 1045 coaxial with the central optical axis 142 of the corresponding light-emitting device 14. In the example shown in FIG. 7, the second optical adjustment surface 1044 is a second convex spherical surface. The devices and members in FIG. 7 identical to those shown in FIG. 2 are given the same numerical notations, and will be not described in detail herein. When the first optical adjustment surface 1041 is a second convex spherical surface, a second convex aspheric surface, or a second Fresnel convex arc surface, the beam angle of the light, emitted by the light-emitting device 14, entering the light guide plate 10 is converged, that is, the second optical adjustment surface 1044 has a concentrating effect on the light emitted by the light-emitting device 14.

In one embodiment, similarly, in order to fit the plurality of light-emitting devices 14 into their corresponding through holes 104, and to consider the machining and manufacturing tolerances of the light guide plate 10, the circuit board 12 and other devices and members, a second shortest distance d2 between the second optical adjustment surface 1044 of the second specific through hole 104b and the light-emitting side face 140 of the corresponding light-emitting device 14 can range from 0.04 mm to 0.12 mm. The second shortest distance d2 also takes into consideration the optical design parameters (e.g., focal distance) of the second optical adjustment surface 1044.

Figure 8:
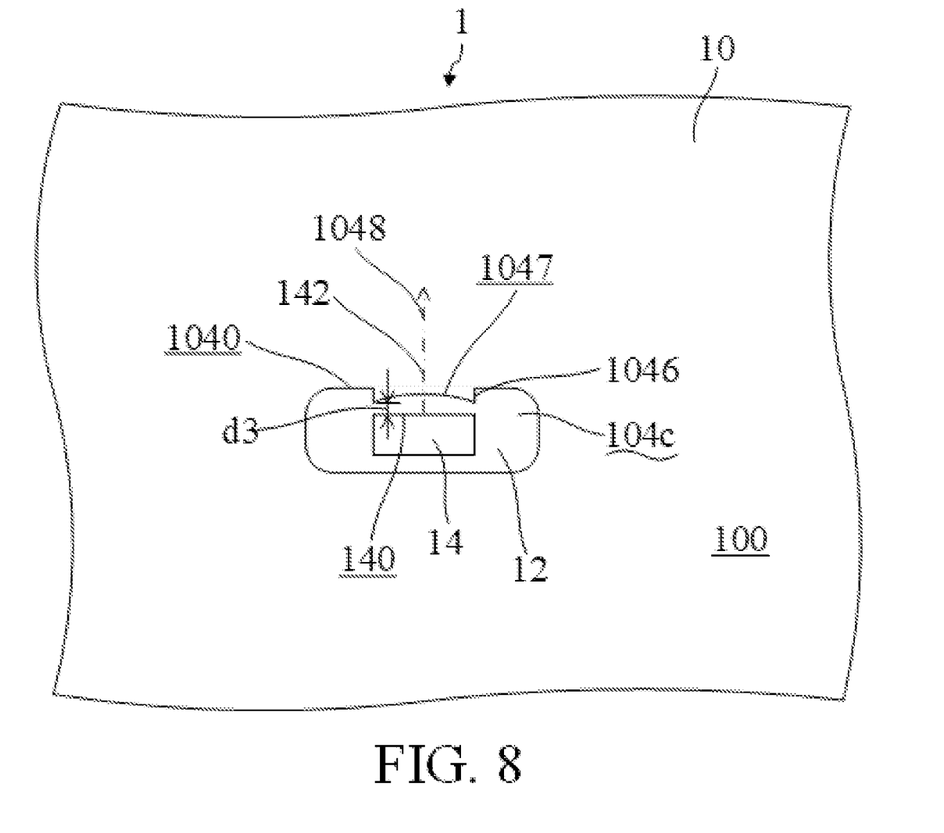
FIG. 8 is a partial top view of another modification of the backlight apparatus used in the illuminated keyboard according to the preferred embodiment of the invention.

Referring to FIG. 8, FIG. 8 schematically illustrates with a partial top view another modification of the backlight apparatus 1 keyboard according to the preferred embodiment of the invention. As shown in FIG. 8, in the modification of the backlight apparatus 1 of the invention, a third specific through hole 104c of the plurality of through holes 104 has a protrusion formed on the light incident surface 1040. The protrusion has a third optical adjustment surface 1047 facing the light-emitting side face 140 of the corresponding light-emitting device 14. The third optical adjustment surface 1047 can be a second concave spherical surface, a second concave aspheric surface, a second Fresnel concave arc surface, and so on. The third optical adjustment surface 1047 has a third curved surface central axis 1048 coaxial with the central optical axis 142 of the corresponding light-emitting device 14. In the example shown in FIG. 8, the third optical adjustment surface 1047 is a second concave spherical surface. The devices and members in FIG. 8 identical to those shown in FIG. 2 are given the same numerical notations, and will be not described in detail herein. When the third optical adjustment surface 1047 is a second concave spherical surface, a second concave aspheric surface, or a second Fresnel concave arc surface, the beam angle of the light, emitted by the light-emitting device 14, entering the light guide plate 10 is widened, that is, the third optical adjustment surface 1047 has an astigmatism effect on the light emitted by the light-emitting device 14.

In one embodiment, similarly, in order to fit the plurality of light-emitting devices 14 into their corresponding through holes 104, and to consider the machining and manufacturing tolerances of the light guide plate 10, the circuit board 12 and other devices and members, a third shortest distance d3 between the third optical adjustment surface 1047 of the third specific through hole 104c and the light-emitting side face 140 of the corresponding light-emitting device 14 can range from 0.04 mm to 0.12 mm. The third shortest distance d3 also takes into consideration the optical design parameters (e.g., focal distance) of the third optical adjustment surface 1047.

With the detailed description of the above preferred embodiments of the invention, it is clear to understand that the backlight apparatus used in the illuminated keyboard according to the invention, the beam angle of the light emitted by the light-emitting devices entering into the light-guiding plate can be adjusted. Thereby, the backlight apparatus used in the luminous keyboard according to the invention can effectively utilize the energy of the light emitted by the light-emitting devices. The brightness of the patterns on the keycaps of the illuminated keyboard using the backlight apparatus of the invention is uniform.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A backlight apparatus used in an illuminated keyboard, comprising:
a light-guiding plate, having a top face, a back face and a plurality of through holes, each through hole having a respective light incident surface;
a circuit board; and
a plurality of light-emitting devices, all being electrically bonded on the circuit board, each light-emitting device having a respective light-emitting side face and a respective central optical axis and corresponding to one of the plurality of through holes, wherein the circuit board is disposed on the back face of the light-guiding plate such that each light-emitting device is disposed within the corresponding through hole, and that the light-emitting side face of each light-emitting device faces the light incident surface of the corresponding through hole, each light-emitting device emits a light from the light-emitting side face thereof to the light incident surface of the corresponding through hole, and then the light enters into the light-guiding plate;
wherein a first specific through hole of the plurality of through holes has a first optical adjustment surface on the light incident surface thereof, the first optical adjustment surface is one selected from the group consisting of a first concave spherical surface, a first convex spherical surface, a first concave aspherical surface, a first convex aspherical surface, a first Fresnel concave arc surface and a first Fresnel convex arc surface, the first optical adjustment surface has a first curved surface central axis coaxial with the central optical axis of the corresponding light-emitting device,
wherein a first shortest distance between the first optical adjustment surface of the first specific through hole and the light-emitting side face of the corresponding light-emitting device ranges from 0.04 mm to 0.12 mm.

2. The backlight apparatus of claim 1, wherein the light-guiding plate also has a first breakout hole, the first breakout hole is located on a first original optical path of the light, if without an adjustment by the first optical adjustment surface of the first specific through hole, entering the light-guiding plate from the light incident surface of the first specific through hole, after the light is adjusted by the first optical adjustment surface of the first specific through hole, a first adjusted optical path of the adjusted light entering the light-guiding plate does not pass through the first breakout hole.

3. The backlight apparatus of claim 2, wherein the light-guiding plate also has a second breakout hole, the second breakout hole is located on a second original optical path of the light, if without an adjustment by the first optical adjustment surface of the first specific through hole, entering the light-guiding plate from the light incident surface of the first specific through hole, after the light is adjusted by the first optical adjustment surface of the first specific through hole, a second adjusted optical path of the adjusted light entering the light-guiding plate does not pass through the second breakout hole, the first adjusted optical path and the second adjusted optical path are located between the first breakout hole and the second breakout hole.

4. The backlight apparatus of claim 1, wherein a second specific through hole of the plurality of through holes has a recession formed on the light incident surface, the recession has a second optical adjustment surface facing the light-emitting side face of the corresponding light-emitting device, the second optical adjustment surface is one selected from the group consisting of a second convex spherical surface, a second convex aspheric surface and a second Fresnel convex arc surface, and the second optical adjustment surface has a second curved surface central axis coaxial with the central optical axis of the corresponding light-emitting device.

5. The backlight apparatus of claim 4, wherein a second shortest distance between the second optical adjustment surface of the second specific through hole and the light-emitting side face of the corresponding light-emitting device ranges from 0.04 mm to 0.12 mm.

6. The backlight apparatus of claim 1, wherein a third specific through hole of the plurality of through holes has a protrusion formed on the light incident surface, the protrusion has a third optical adjustment surface facing the light-emitting side face of the corresponding light-emitting device, the third optical adjustment surface is one selected from the group consisting of a second concave spherical surface, a second concave aspheric surface and a second Fresnel concave arc surface, and the third optical adjustment surface has a third curved surface central axis coaxial with the central optical axis of the corresponding light-emitting device.

7. The backlight apparatus of claim 6, wherein a third shortest distance between the third optical adjustment surface of the third specific through hole and the light-emitting side face of the corresponding light-emitting device ranges from 0.04 mm to 0.12 mm.

* * * * *